United States Patent
Mahurin

Patent Number: 6,094,669
Date of Patent: Jul. 25, 2000

[54] CIRCUIT AND METHOD FOR DETERMINING OVERFLOW IN SIGNED DIVISION

[75] Inventor: Eric W. Mahurin, Austin, Tex.

[73] Assignee: Advanced Micro Devices, Inc., Sunnyvale, Calif.

[21] Appl. No.: 09/057,418

[22] Filed: Apr. 8, 1998

[51] Int. Cl.[7] ...................................... G06F 7/52
[52] U.S. Cl. ............................................... 708/655
[58] Field of Search ................................. 708/655, 656

[56] References Cited

U.S. PATENT DOCUMENTS

| | | | |
|---|---|---|---|
| 5,016,210 | 5/1991 | Sprague et al. | 708/655 |
| 5,574,677 | 11/1996 | Cohen | 708/655 |
| 5,615,113 | 3/1997 | Matula | 708/655 |
| 5,675,528 | 10/1997 | Matula | 708/655 |
| 5,748,518 | 5/1998 | Jaggar | 364/764 |
| 5,805,489 | 9/1998 | Fernando . | |

*Primary Examiner*—David H. Malzahn
*Attorney, Agent, or Firm*—Conley, Rose & Tayon, PC; B. Noel Kivlin

[57] ABSTRACT

A circuit and method are provided for dividing a signed numerator by a signed denominator and generating a signal when the division results in overflow condition. The circuit generates a partial remainder using a partial remainder generation circuit, and a partial quotient using a partial quotient generation circuit. The partial remainder is initialized to a first value dependent upon the n most significant bits of the numerator, and the partial quotient is initialized to a first value dependent upon the n least significant bits of the numerator. Second values of the partial remainder and the partial quotient are generated dependent upon the first values of the partial remainder and the partial quotient. An overflow signal is generated if the second value of the partial quotient is equal to zero. The quotient and the remainder are generated dependent upon the second values of the partial remainder and the partial quotient, and the overflow signal is generated dependent upon the quotient.

12 Claims, 3 Drawing Sheets

CIRCUIT AND METHOD FOR DETERMINING OVERFLOW IN SIGNED DIVISION

BACKGROUND OF THE INVENTION

1. Field of the Invention

This invention generally relates to the field of microprocessors, and more particularly to a circuit and method for dividing a signed numerator by a signed denominator and for determining whether the division results in an overflow condition.

2. Description of the Relevant Art

Microprocessors determine the speed and power of personal computers, and a growing number of more powerful machines, by handling most of the data processing in the machine. Microprocessors typically include at least three functional groups: the input/output unit (I/O), the control unit, and the arithmetic logic unit (ALU). The I/O unit interfaces between external circuitry and the ALU and the control unit. I/O units frequently include signal buffers for increasing the current capacity of a signal before the signal is sent to external components. A control unit controls the operation of the microprocessor by fetching instructions from the I/O unit and translating the instructions into a form that can be understood by the ALU. In addition, the control unit keeps track of which step of the program is being executed. The ALU handles the mathematical computations and logical operations that are performed by the microprocessor. The ALU executes the decoded instructions received from the control unit in order to modify data contained in registers within the microprocessor.

One essential function of the ALU is to execute instructions for dividing operands. The ALU typically performs division on at least two input operands, a numerator and a denominator. In general, dividing the numerator by the denominator results in a quotient and a remainder. In other words:

$$N=QD+R \quad (1)$$

where N represents the numerator, Q represents the quotient, D represents the denominator, and R represents the remainder. N, the first operand, can be represented by up to 2n-bits. D, the second operand, can be represented by up to n-bits. With N represented by up to 2n-bits and D represented by up to n-bits, Q and R can generally represented by up to n-bits.

Often times, the division of the two operands, N and D, will result in an overflow condition. Generally, with respect to signed operands, an overflow condition occurs when Q and/or R do not fit within the following ranges:

$$-2^{n-1} \leq Q \leq 2^{n-1}, \text{ or} \quad (2)$$

$$-|D|+1 \leq R \leq |D|-1. \quad (3)$$

It is important to detect the occurrence of an overflow condition when dividing two signed operands. Typically a flag is set within the microprocessor when an overflow condition results from the division of two signed operands. The flag, once set, alerts the software to jump to, for example, an exception routine. The exception routine, in turn, alerts the system of the overflow or error encountered. In x86 architectures, when a division overflow condition arises, an interrupt routine is immediately called which interrupts the application.

One of ordinary skill in the art will recognize that an overflow condition will not occur if the following equations hold true:

$$Q=-2^{n-1} \text{ or } |Q| \leq 2^{n-1}-1, \text{ and} \quad (4)$$

$$|R| \leq |D|-1. \quad (5)$$

Equation 5 follows from the observation that the remainder must always be less than the denominator. Ignoring the situation in which Q equals the maximum negative allowable value (i.e., $-2^{n-1}$), one of ordinary skill in the art will recognize from the above equations that an overflow condition will not occur in a signed division operation if:

$$|N| \leq (2^{n-1})|D|-1 \quad (6)$$

Equation 6 reduces to the following:

$$|N| < 2^{n-1}|D| \quad (7)$$

Equation 7 is implemented in the prior art to determine whether an overflow condition occurs when dividing two signed operands N and D. The prior art implementation has severe disadvantages. The prior art implementation requires (1) checking the numerator and the denominator to determine whether they are negative values, (2) calculating absolute values for the denominator and the numerator if they are negative, (3) shifting the absolute value of the denominator (which is the same as multiplying the denominator by $2^{n-1}$), and (4) comparing the absolute value of the numerator against the shifted absolute value of the denominator. Each of these four steps requires significant processing time and hardware. For example, the absolute value calculations may involve two's complement operations. The time needed to perform a two's complement operation on an operand depends upon the length of the operand. In a 32-bit microprocessor, N could be up to 64 bits wide while D could be up to 32 bits wide. Performing a two's complement on 64-bit and 32-bit operands can require significant processing time. Further, implementing Equation 7 to detect an overflow condition requires a 64-bit comparison between the absolute value of N and the absolute value of D shifted left 32 bits with zero fill.

A faster method is needed for determining whether an overflow condition arises during signed operand division which avoids testing the numerator and denominator to determine whether they are negative operands, inverting the numerator and denominator when they are negative, multiplying the denominator by $2^{n-1}$ and comparing 2n-bit wide operands to determine which is larger.

SUMMARY OF THE INVENTION

The problems identified above are in large part addressed by a method of using a microprocessor to generate a quotient and a remainder, the combination of which represents a result of dividing a 2n-bit signed numerator by a n-bit signed denominator and to generate an overflow signal when the division results in an overflow condition. In one embodiment, the circuit and method generate partial quotients and partial remainders. The partial remainder is generated as a finction of the n most significant bits of the signed numerator and the signed denominator. The partial quotient is generated as a finction of the least significant bits of the signed numerator. The method and circuit, in this embodiment, further generates the quotient and remainder, wherein the quotient is generated as a function of the partial quotient and the remainder is generated as a function of the partial quotient. In this embodiment, the partial quotient and the quotient are compared to logical zero. The overflow signal is generated when the partial quotient equals zero or the quotient does not equal zero.

One advantage of the present invention is that it generates an overflow signal when the division of a numerator by a denominator results in an overflow condition.

Another advantage of the present condition is that it simplifies the number of steps necessary to determine whether an overflow condition results in a signed division operation.

Yet another advantage of the present invention is that it detects an overflow condition when dividing two signed operands by simply comparing a quotient and partial quotient against zero.

Still another advantage of the present invention is that it eliminates the prior art need to check the signed bit of the numerator and take a two's complement of the numerator if the signed bit indicates that the numerator is a negative quantity.

Still another advantage of the present invention is that it avoids comparing a pair of double-wide operands.

BRIEF DESCRIPTION OF THE DRAWINGS

Other objects and advantages of the invention will become apparent upon reading the following detailed description and upon reference to the accompanying drawings in which.

Figure 1:
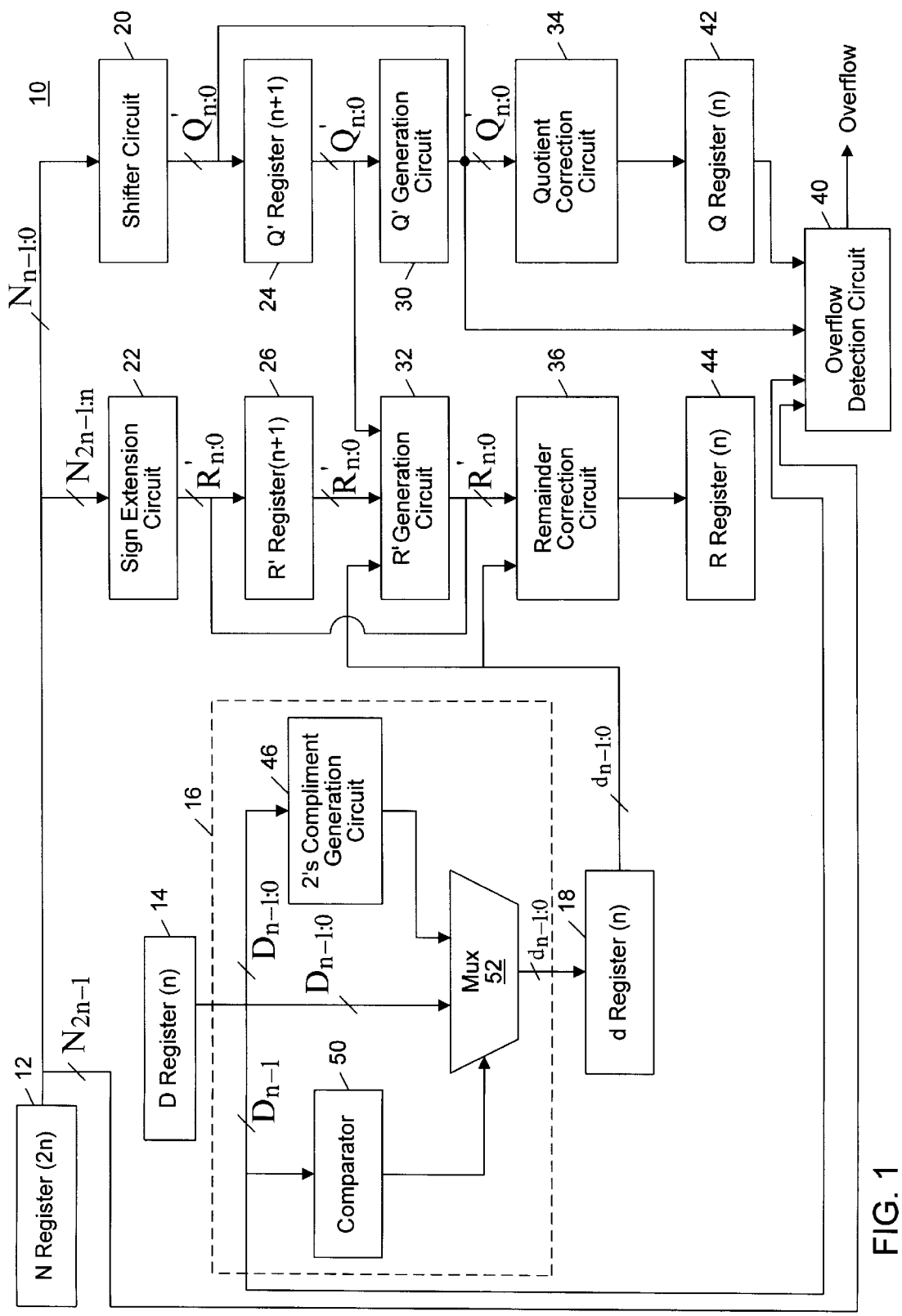
FIG. 1 is a block diagram of a circuit employing the present invention.

While the present invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE PREFERRED EMBODIMENTS

FIG. 1 is a block diagram of a circuit 10 employing one embodiment of the present invention. It is noted that the circuit shown in FIG. 1 can be implemented in connection with a microprocessor.

The circuit 10 includes a numerator register 12 configured to store a 2n-bit numerator (N), a denominator register 14 configured to store a n-bit denominator (D), a circuit 16 for generating an absolute value (d) of the denominator stored within register 14, a register 18 configured to store the absolute value of the denominator D, a multiplier (shifter) circuit 20, a sign extension circuit 22, a partial quotient (Q') register 24, a partial remainder (R') register 26, a partial quotient generation circuit 30, a partial remainder generation circuit 32, a quotient correction circuit 34, a remainder correction generation circuit 36, an overflow detection circuit 40, a quotient register 42 for storing a quotient (Q), and a remainder register 44 for storing a remainder (R). The absolute value generation circuit 16 in turn includes a two's complement generation circuit 46, a comparator 50, and a multiplexer 52.

The circuit shown in FIG. 1 is configured to divide a signed 2n-bit numerator by a signed n-bit denominator, and generate an overflow signal at the overflow detection circuit 40 when division of the 2n-bit numerator by the n-bit denominator results in the overflow condition described in the background above. It is to be understood, however, that the present invention can be implemented in circuit configurations other than that shown in FIG. 1.

The numerator register 12 is coupled to shifter 20 and sign extension circuit 22. It is noted, however, that shifter 20 and sign extension circuit 22 do not receive the same data. Rather, sign extension circuit 22 is configured to receive the n most significant bits of the numerator (i.e., $N_{2n-1:n}$) stored within register 12 while shifter 20 is configured to receive the n least significant bits of the numerator (i.e., $N_{n-1:0}$) stored in register 12. Shifter 20 is configured to shift the n least significant bits of the numerator left by one with zero fill thereby generating a (n+1) bit operand which is stored in partial quotient register 24 as a first partial quotient. Sign extension circuit 22 operates in parallel with shifter 20. Sign extension circuit 22 operates to sign extend the n most significant bits of the numerator by one bit thereby generating an (n+1) bit operand which is stored in partial remainder register 26 as a first partial remainder.

Partial quotient generation circuit 30 is coupled to receive the (n+1) bit operand stored in partial quotient register 24. As noted in FIG. 1, the (n+1) bit output of partial quotient generation circuit 30 is fed back to and stored in partial quotient register 24 in addition to being provided to overflow check circuit 40 and quotient correction circuit 34. Partial quotient generation circuit 30 operates according to the value of the partial remainder currently stored in register 26 as will be described more fully below. Although not show in FIG. 1, is to be understood that the partial remainder currently stored within register 26 is provided to partial quotient generation circuit. Further, as will be more fully described below, partial quotient generation circuit 30 is configured to iteratively generate n partial quotients, each one of which is generated as a function of the current partial quotient, except for the first partial quotient which is provided by shifter 20.

Partial remainder generation circuit 32 is configured to receive the most significant bit of the partial quotient stored in partial quotient register 24, the (n+1) bit partial remainder stored in register 26, and the absolute value of the denominator stored in register 18. As noted in FIG. 1, the (n+1) bit output of the partial remainder generation circuit 32 is fed back to and stored in partial remainder register 26 in addition to being provided to remainder correction circuit 36. Partial remainder generation circuit 32 operates according to the value of the partial remainder currently stored in register 26 as will be described more fully below. Partial remainder generation circuit 32 is configured to iteratively generate n partial remainders, each one of which is generated as a finction of the previous partial remainder, the absolute value of the denominator stored in register 18, and the most significant bit of the partial quotient stored within register 24, except for the first partial remainder which is provided by sign extension circuit 22.

Quotient correction circuit 34 is coupled to receive the $n^{th}$ iteration of the partial quotient from partial quotient generation circuit 30. Overflow check circuit 40 operates to compare the $n^{th}$ iteration of the partial quotient against zero. If the $n^{th}$ iteration equals zero, then overflow check circuit 40 generates a signal indicative thereof at its output. This signal indicates that the division of the numerator stored within register 12 by the denominator stored within register 14, results in an overflow condition.

Remainder correction circuit 36 is coupled to receive the $n^{th}$ of the partial remainder from partial remainder generation circuit 32, the numerator from register 12, and the absolute value of the denominator from register 18. Remainder correction circuit 36 generates the remainder at its output. The remainder is stored within register 44. Remainder correction circuit 36 may or may not adjust partial remainder provided by partial remainder generation circuit 32 in order to generate the value stored in register 44. As will be more fully described below, modification of the partial remainder to generate the remainder is dependent upon the value of the partial remainder and the value of the numerator.

Quotient correction circuit 34 receives the $n^{th}$ iteration of the partial quotient. Although not shown in FIG. 1, quotient correction circuit 34 also receives the $n^{th}$ iteration of the partial remainder, the numerator stored within register 12, the adjusted partial remainder from remainder correction circuit 36, if any, and denominator stored within register 14. Quotient correction 34 generates the quotient as a function of the partial quotient depending on the values of the $n^{th}$ iteration of the partial remainder from a partial remainder generation circuit 32, an adjusted partial remainder, if any, from remainder correction circuit 36, the numerator, and the denominator, as will be more fully described in connection with the flow chart of FIG. 2. Once the quotient is generated by quotient correction circuit 34, the quotient stored within quotient register 42.

Overflow detection circuit 40 is coupled to receive the numerator from register 12, the denominator from register 14, the partial quotient from partial quotient generation circuit 30, and the quotient from register 42. As is noted above, overflow detection circuit 40 generates an overflow signal when partial quotient from partial quotient generation circuit 30 equals zero. Additionally, the quotient stored in register 42 is tested by overflow detection circuit 40. If (i) the quotient does not equal zero, and (ii) an XOR of the most significant bits of the quotient in register 42, the numerator image to 12, and the demominator in register 14, is a logical one.

Figure 2:
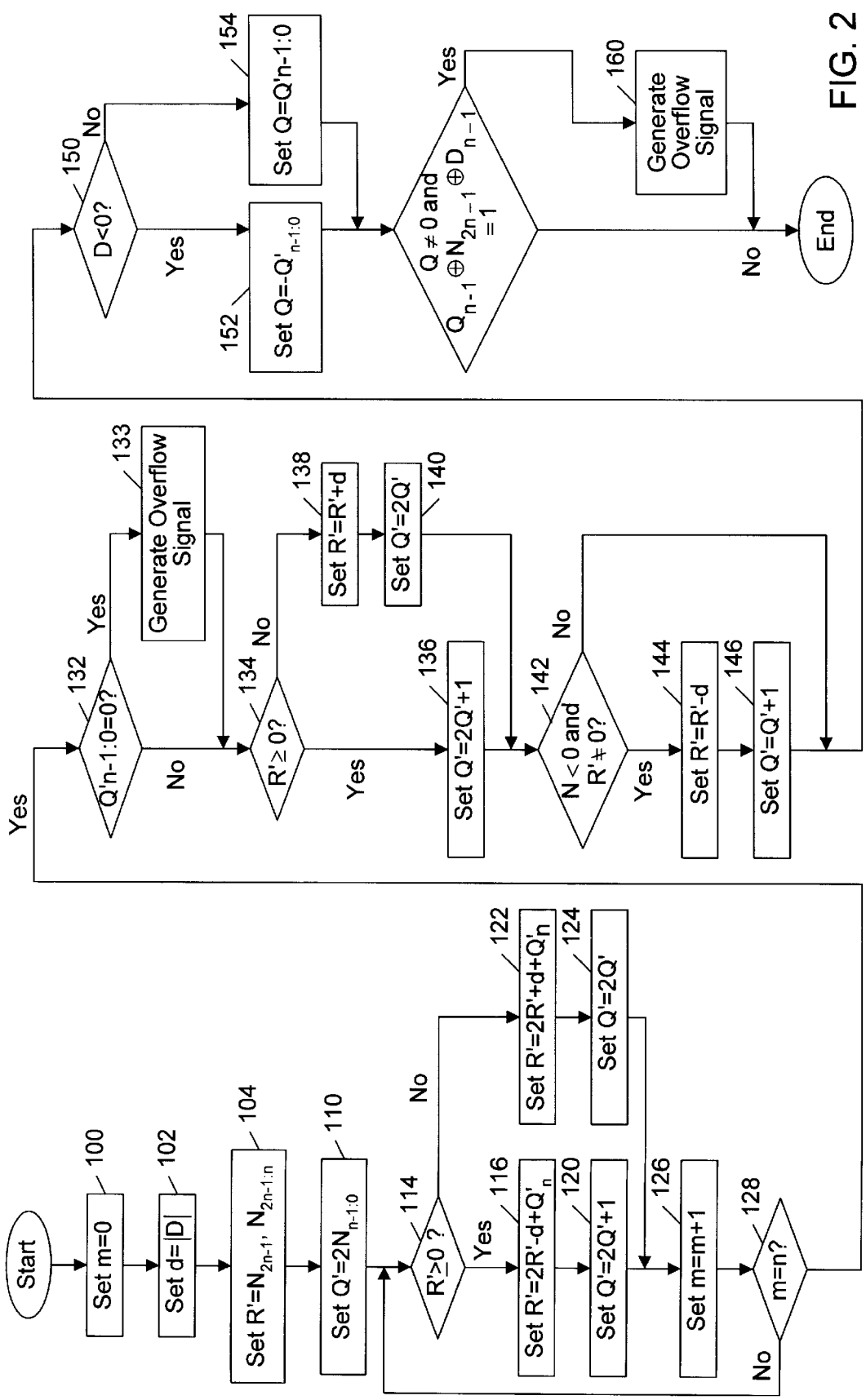
FIG. 2 is a flow chart illustrating operation of the circuit shown in FIG. 1.

FIG. 2 is a flow chart illustrating operation of a circuit, such as the circuit shown in FIG. 1, in accordance with the present invention. It is to be noted, that the method shown in FIG. 2 has application to circuits other than that shown in FIG. 1. Namely, the method described by flow chart shown in FIG. 2 can be implemented on a general purpose digital computer operating in accordance with software designed in accordance with the present invention.

Initially, in step 100, variable m is set to zero. Variable m is a counter which tracks the iterations performed by partial quotient generation circuit 30 and partial remainder generation circuit 32. In step 102, an absolute value of the signed denominator is calculated, the result of which is set to d. In step 104, the partial remainder R' is initially set to be the n most significant bits of the signed numerator, sign extended by one bit. In step 110, the partial quotient Q' is initially set to be the n least significant bits of the signed numerator, multiplied by two.

Thereafter, the partial remainder R' is compared to zero in step 114. If R' is greater than or equal to zero, then R' and Q' are set according to steps 116 and 120. If in step 114 R' is not greater than or equal to zero, then the method proceeds to steps 122 and 124 which calculates alternative values of R' and Q'. Upon completion of step 124 or step 120, m is incremented in step 126. In step 128, the value of m is compared against n, the number of bits of the signed denominator. If the two values are unequal, a subsequent iteration of R' and Q' commences after returning to step 114. However, if m equals n, thus indicating that all iterations of R' and Q' have been completed, the method proceeds to the quotient correction and remainder correction phase defined by steps 132 through 160.

Correction of R' and Q' within steps 132 through 160, depend upon values of R', the signed numerator N, and the signed denominator D. Upon completion of Steps 132 through 160, quotient Q and remainder R are generated and an overflow signal is generated if the division of the signed numerator by the signed denominator results in an overflow condition.

In Step 132, the partial quotient Q' provided by the iteration Steps 114 through 128, is compared against zero. If the partial quotient Q' equals zero then an overflow signal is generated at Step 133. This condition, when satisfied, indicates that the partial remainder was always negative during iteration steps 114 through 128. However, if the partial quotient Q' does not equate to zero in step 132, then the method proceeds to step 134 wherein the current partial remainder R' is compared against zero. If R' is greater than or equal to zero, partial quotient Q' is adjusted as shown in step 136. In the alternative, both R' and Q' are adjusted in steps 138 and 140.

After completion of step 140 or 136, the method proceeds to Step 142 where the signed numerator and the partial remainder R' are compared against zero. It is to be noted that the partial remainder R' may have been corrected in previous step 138. If, as shown in step 142, the signed numerator is less than zero and the partial remainder R' does not equal zero, then the method proceeds to steps 144 and 146 wherein the partial remainder and partial quotient are further adjusted. More particularly, in step 144, partial remainder R' is replaced with its current value less the absolute value of the denominator. In step 146, partial quotient Q' is replaced with its current value plus 1. These two Steps, 144 and 146, are not performed if either of the conditions set forth in step 142 do not hold true. In this case, the method proceeds to the last potential correction. That is, in step 150, the denominator is compared against zero. If the denominator is less than zero, the sign of the partial quotient is reversed in step 152 thereby generating the correct quotient queue. If, however, the signed denominator is not less than zero, then the quotient is set equal to the partial quotient Q' in step 154 and the method proceeds to steps 156.

In step 156, the quotient is compared against zero. If the quotient equals zero, then the division of the signed numerator by the signed denominator, does not result in an overflow condition and the method ends. However, if the quotient does not equal zero, a second test is made in step 156. Namely, the most significant bit of the quotient, the most significant bit of the numerator, and the most significant bit of the denominator are XORed together. If the result equals logical zero, no overflow condition exists and the method ends. If, however, the XOR operation results in a logical one, an overflow signal is generated at step 160.

Figure 3:
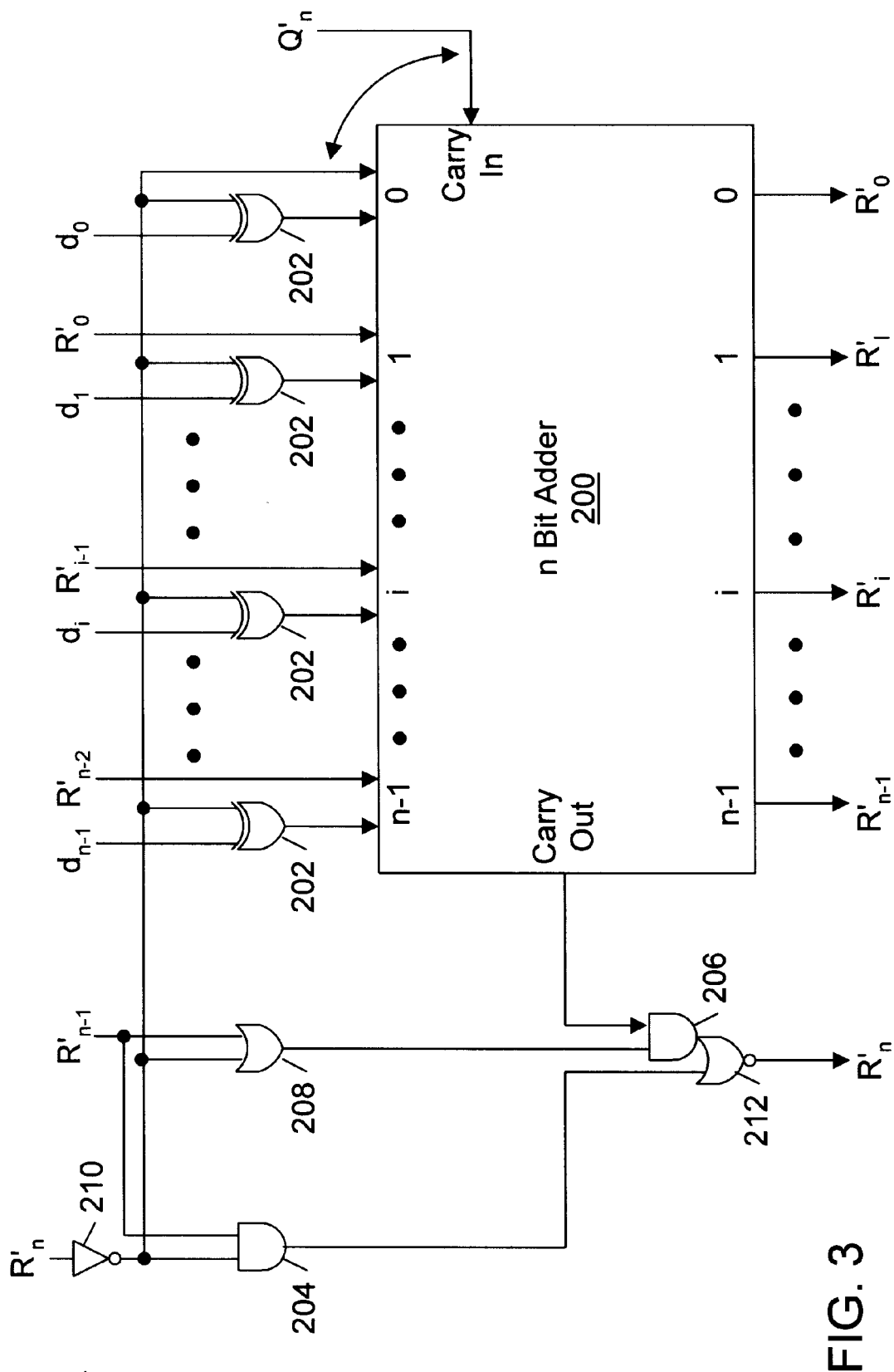
FIG. 3 is a schematic diagram of the partial remainder generation circuit shown in FIG. 1.

FIG. 3 is schematic of one embodiment of the partial remainder generation circuit 32 shown in FIG. 1. It is to be understood that other implementations of the partial remainder generation circuit are considered and the present invention should not be limited to that shown in FIG. 3.

FIG. 3 shows an n-bit adder 200 having n first and second inputs, a carry input, a carry output, and N outputs. Partial remainder generation circuit 32 also includes a set of XOR gates 202 each having a pair of inputs and an output. The output of each XOR gate 202 is coupled to a corresponding first input of N-bit adder 200. Partial remainder generation circuit 32 further includes first and second AND gates 204 and 206, OR gate 208, an inverter 210, and a NOR gate 212. Inverter 210 is coupled to receive the most significant bit of the partial remainder contained in partial remainder register 26 of FIG. 1. One input of each XOR gate 202 is coupled to the output of inverter 210. Thus, each XOR gate to what two receives and is controlled by the version of the most significant bit of the partial remainder R'. The other input of each XOR gate 202 is coupled to receive a corresponding bit of the absolute value of the denominator stored within register 18 of FIG. 1. The n second inputs of n-bit adder 200 are coupled to receive a corresponding bit of the (n−1) least significant bits of the partial remainder stored within partial remainder register 26. Carry input, as shown in FIG. 3, is coupled to receive the most significant bit of the partial quotient Q' stored within partial quotient register 24 of FIG. 1. It is to be understood, however, that the values provided to the least significant second input of the n-bit adder 200 and the carry input of adder 200, can be switched so that the carry input is coupled to receive the output of inverter 210 and the least significant second input is coupled to receive the most significant bit of the partial quotient.

As noted in FIG. 3, one input of AND gate 204 is coupled to the output of inverter 210 while the other input of AND gate 204 is coupled to receive the second most significant bit of the partial remainder R'. OR gate 208 has a pair of inputs that are similarly coupled. The output of AND gate 204 is coupled to a first input of NOR gate 212, and the output of OR gate 208 is coupled to one of the inputs of AND gate 206. The other input of AND gate 206 is coupled to carry output of n-bit adder 200. The output of AND gate 206 is coupled to a second input of NOR gate 212.

The outputs of the n-bit adder 200 and NOR gate 212 generate the subsequent partial remainders which in turn is provided via feedback to the partial remainder register 26, and to the remainder correction circuit. Partial remainder circuit 32 shown in FIG. 3 is configured to implement Steps 116 or 122 shown in FIG. 2. Namely, partial remainder generation circuit generates the subsequent or new partial remainder by adding or subtracting the absolute value of the denominator stored within register 18 to the most significant bit of the partial quotient stored within register 24, the result of which is added to the current partial remainder stored in which 26 multiplied by two. multiplying the current partial remainder stored in register 26 by two, adding the result to the most significant bit of the current partial quotient stored in register 24 in addition to adding or subtracting the absolute value of the denominator depending upon the most significant bit of the current partial remainder stored in register 26. If the current partial remainder is less than zero, then the absolute value of the denominator is subtracted. If the current partial remainder is greater then or equal to zero, then the absolute value of the denominator is added. The multiplication of the current partial remainder is implemented by staggering the bits of the partial remainder with respect to the second inputs of the n-bit adder 200.

Partial remainder generation circuit 32 operates in parallel with the partial quotient circuit 30 shown in FIG. 1. After n iterations of the partial quotient and partial remainder via circuits 30 and 32, the partial quotient and partial remainder is provided to quotient correction circuit 34 and remainder correction 36, respectively. These circuits, in turn, generate the quotient and remainders which in turn are stored within registers 42 and 44. It is noted again that the overflow check circuit 40 determines whether an overflow condition results by (1) checking the value of the partial quotient against zero after n iterations, and (2) checking the quotient against zero, and XORing the most significant bit of the quotient, numerator, and denominator.

While the present invention has been described with reference to particular embodiments, it will be understood that the embodiments are illustrated and that the invention scope is not so limited. Variations, modifications, additions, and improvements to the embodiments described are possible. These variations, modifications, additions, and improvements may fall within the scope of the invention as detailed in the following claims.

What is claimed is:

1. A method of using a CPU to generate a quotient and a remainder the combination of which represents a result of dividing a 2n bit signed numerator by a n signed denominator, and to generate an overflow signal when the quotient exceeds n bits, the method comprising:

initializing a partial remainder to a first value dependent upon the n most significant bits of the numerator;

initializing a partial quotient to a first value dependent upon the n least significant bits of the numerator;

generating a second value of the partial remainder and a second value of the partial quotient dependent upon the first values of the partial remainder and the partial quotient;

generating the overflow signal if the second value of the partial quotient is equal to zero;

generating the quotient and the remainder dependent upon the second values of the partial remainder and the partial quotient; and generating the overflow signal dependent upon the quotient.

2. The method of claim 1, wherein the step of generating the second value of the partial remainder is accomplished using an absolute value of the denominator.

3. The method of claim 2, wherein the step of generating the second value of the partial remainder comprises:

comparing the first value of the partial remainder to zero;

if the first value of the partial remainder is greater than or equal to zero, computing an interim value of the partial remainder by multiplying the first value of the partial remainder by two, subtracting the absolute value of the denominator, and adding the most significant bit of the first value of the partial quotient; and if the first value of the partial remainder is less than zero, computing the interim value of the partial remainder by multiplying the first value of the partial remainder by two, adding the absolute value of the denominator, and adding the most significant bit of the first value of the partial quotient.

4. The method of claim 3, wherein the step of generating the second value of the partial quotient comprises:

comparing the first value of the partial remainder to zero;

if the first value of the partial remainder is greater than or equal to zero, computing an interim value of the partial quotient by multiplying the first value of the partial quotient by two and adding one; and if the first value of the partial remainder is less than zero, computing the interim value of the partial quotient by multiplying the first value of the partial quotient by two.

5. The method of claim 1, wherein the step of generating the overflow signal dependent upon the quotient comprises:

logically XORing the most significant bits of the quotient, the numerator and the denominator; and generating the overflow signal if the logically XORing step produces a result equal to logical one.

6. A CPU for generating a multi-bit quotient and a multi-bit remainder the combination of which represents a result of dividing a 2n bit signed numerator by a n bit signed denominator, and for generating an overflow signal when the quotient exceeds n bits, the CPU comprising:

a first data storage circuit for storing the signed numerator;

a second data storage circuit for storing the signed denominator;

a partial remainder generation circuit coupled to the first and second data storage circuits and configured to generate a partial remainder as a function of the n most significant bits of the signed numerator and the signed denominator;

a partial quotient generation circuit coupled to the first data storage circuit and configured to generate a partial quotient as a function of the n least significant bits of the signed numerator;

a quotient correction circuit coupled to receive the partial quotient and configured to generate the quotient as a function of the partial quotient;

a remainder correction circuit coupled to receive the partial remainder and configured to generate the remainder as a function of the partial remainder;

an overflow check circuit coupled to the partial quotient generation circuit and to receive the quotient, wherein the overflow check circuit is configured to compare the partial quotient and quotient to zero, and wherein the overflow check circuit generates the overflow signal when the partial quotient equals zero or when the quotient does not equal zero.

7. The CPU of claim 6 further comprising:

a sign extension circuit configured to receive the n most significant bits of the signed numerator, wherein the sign extension circuit is configured to generate a first partial remainder by sign extending the n most significant bits of the signed numerator by one bit;

a third data storage circuit for storing the first partial remainder, wherein the third data storage circuit is coupled to the sign extension circuit and the partial remainder generation circuit.

8. The CPU of claim 7 further comprising:

a shifter configured to receive the n least significant bits of the signed numerator, wherein the shifter is configured to generate a first partial quotient by shifting the n least significant bits of the signed numerator left by one bit;

a fourth data storage circuit for storing the first partial quotient, wherein the fourth data storage circuit is coupled to the shifter and the partial quotient generation circuit.

9. The CPU of claim 8 further comprising:

an absolute value generation circuit coupled to receive the signed denominator, wherein the absolute value generation circuit is configured to generate an n-bit operand representing an absolute value of the signed denominator, and;

a fifth data storage circuit configured to store the absolute value of the signed denominator, wherein the fifth data storage circuit is coupled to the partial remainder generation circuit and the remainder generation circuit.

10. The CPU of claim 9, wherein the partial remainder generation circuit comprises:

an n bit adder having n first and second inputs, a carry input, n outputs, and a carry output;

an inverter having an input and an output, wherein the input is configured to receive the most significant bit of the first partial remainder;

n XOR gates each having a pair of inputs and an output, wherein one input of each XOR gate is coupled to the output of the inverter, wherein another input of each XOR gate is configured to receive a corresponding bit of the absolute value of the signed denominator stored in the fifth data storage circuit; and wherein each of the first inputs of the adder is coupled to the output of a corresponding XOR gate, and wherein the (n−1) most significant second inputs of the adder are coupled to the (n−1) least significant bits of the first partial remainder, and wherein either (1) the least significant second input of the adder is coupled to receive the most significant bit of the first partial quotient and the carry input is coupled to the output of the inverter, or (2) the least significant second input of the adder is coupled to the output of the inverter and the carry input is coupled to receive the most significant bit of the first partial quotient.

11. The CPU of claim 10 wherein the partial remainder generation circuit further comprises:

a NOR gate having a pair of inputs and an output;

an OR gate having a pair of inputs and an output;

first and second AND gates each having a pair of inputs and an output;

wherein one input of the first AND gate is coupled to the output of the inverter, and another input of the first AND gate is coupled to receive the second most significant bit of the first partial remainder stored in the third data storage circuit;

wherein one input of the OR gate is coupled to the output of the inverter, and another input of the OR gate is coupled to receive the second most significant bit of the first partial remainder stored in the third data storage circuit;

wherein one input of the second AND gate is coupled to the carry output of the n bit adder, and another input of the second AND gate is coupled to the output of the OR gate; and wherein the inputs of the NOR gate are coupled to the outputs of the first and second AND gates.

12. The CPU of claim 9 wherein:

the partial remainder generation circuit is configured to generate the partial remainder by shifting the first partial remainder left by one bit with zero fill, negating the absolute denominator, and adding the shifted first partial remainder, the negated absolute denominator, and the most significant bit of the first partial quotient when the partial remainder is greater then or equal to zero, and;

the partial remainder generation circuit is configured to generate the partial remainder by shifting the first partial remainder left by one bit with zero fill, and adding the shifted first partial remainder, the absolute value of the signed denominator stored in the fifth data storage circuit, and the most significant bit of the first partial quotient when the first partial remainder is greater then or equal to zero.

* * * * *